United States Patent [19]
Haessig, Jr.

[11] Patent Number: 5,220,456
[45] Date of Patent: Jun. 15, 1993

[54] MIRROR POSITIONING ASSEMBLY FOR STABILIZING THE LINE-OF-SIGHT IN A TWO-AXIS LINE-OF-SIGHT POINTING SYSTEM

[75] Inventor: David A. Haessig, Jr., Towaco, N.J.

[73] Assignee: GEC-Marconi Electronic Systems Corp., Wayne, N.J.

[21] Appl. No.: 802,870

[22] Filed: Dec. 6, 1991

[51] Int. Cl.$^5$ .................. G02B 27/64; G02B 27/32
[52] U.S. Cl. ........................ 359/554; 359/555; 356/255
[58] Field of Search ............... 359/554–557, 359/630–638; 356/246–255; 244/3.12–3.19; 342/80, 95, 107, 195

[56] References Cited

U.S. PATENT DOCUMENTS

| | | | |
|---|---|---|---|
| 3,456,074 | 7/1969 | Wilson | 359/554 |
| 3,582,180 | 6/1971 | Gross | 359/557 |
| 3,619,500 | 11/1971 | Bouley | 359/554 |
| 4,722,601 | 2/1988 | McFarlane | 359/637 |
| 4,881,800 | 11/1989 | Fuchs et al. | 359/555 |
| 4,883,347 | 11/1989 | Fritzel | 359/555 |
| 5,122,908 | 6/1992 | Sporer | 359/557 |

FOREIGN PATENT DOCUMENTS 2560677  9/1985  France .................. 359/554

Primary Examiner—Bruce Y. Arnold
Assistant Examiner—Thong Nguyen
Attorney, Agent, or Firm—David L. Davis

[57] ABSTRACT

An arrangement for stabilizing the line of sight in an optical tracking system by isolating the line of sight from angular vibration induced by the coarse positioning system. The tracking error of the coarse positioning system is transformed from its existing coordinate system onto the line of sight (scene) coordinates and this transformed error is utilized for stabilization.

2 Claims, 6 Drawing Sheets

MIRROR POSITIONING ASSEMBLY FOR STABILIZING THE LINE-OF-SIGHT IN A TWO-AXIS LINE-OF-SIGHT POINTING SYSTEM

BACKGROUND OF THE INVENTION

This invention relates to an optical tracking system for establishing a line of sight in accordance with a position command signal and, more particularly, to an arrangement in such a system for stabilizing the line of sight by moving a mirror to nullify vibrational effects.

U.S. Pat. No. 4,881,800, the contents of which are hereby incorporated by reference herein, discloses an optical tracking and stabilization system for use in an aircraft vehicle which tracks the movement of the pilot's helmet by developing a position command signal which causes the line of sight of the optical system to follow the line of sight of the pilot. In the disclosed system, a mirror is flexibly mounted to a rigid block which in turn is fixedly mounted to the inner gimbal of a pair of gimbals. A gyroscope having a spin axis aligned with the line of sight of the optical system is mounted to the rigid block to develop signals which are utilized to control movement of the mirror relative to the rigid block so as to nullify vibrations which emanate both from the gimbal system during its positioning of the rigid block and from the vehicle.

While the system disclosed in the aforereferenced patent is effective for its intended purpose, if in a particular application the optical system is subject to negligible aircraft vibration, the gyroscope becomes unnecessary. It is therefore an object of the present invention to provide a stabilization system of the type described in an environment where aircraft vibration can be ignored.

It is a more specific object of this invention to provide such a system which does not utilize a gyroscope.

It is a further object of this invention to provide such a stabilization system in an optical tracking system utilizing a pair of non-orthogonal gimbals.

SUMMARY OF THE INVENTION

The foregoing, and additional, objects are attained in accordance with the principles of this invention in an optical system for establishing a line of sight relative to a ground plane by positioning a mirror in accordance with a position command signal, the system including a rigid block movable about a block elevation axis and a block azimuth axis, means flexibly coupling the mirror to the rigid block so as to provide a mirror elevation axis and a mirror azimuth axis relative to the rigid block, and coarse positioning means responsive to the position command signal for moving the rigid block about the block elevation axis and the block azimuth axis so that the rigid block attains a position defined by the position command signal. The present invention contemplates providing an arrangement for positioning the mirror so that vibrations of the coarse positioning means do not affect the line of sight. The inventive arrangement comprises means for sensing the actual position of the rigid block and providing a block position signal corresponding to the sensed actual position of the rigid block and means responsive to the block position signal and the position command signal for providing an error signal corresponding to the difference between the defined position and the actual position of the rigid block. The error signal so generated has components for the block elevation and azimuth axes and the inventive arrangement further includes means for transforming the error signal into a stabilization signal having components for the mirror elevation and azimuth axes and means responsive to the stabilization signal for moving the mirror relative to the rigid block so as to minimize the error signal.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
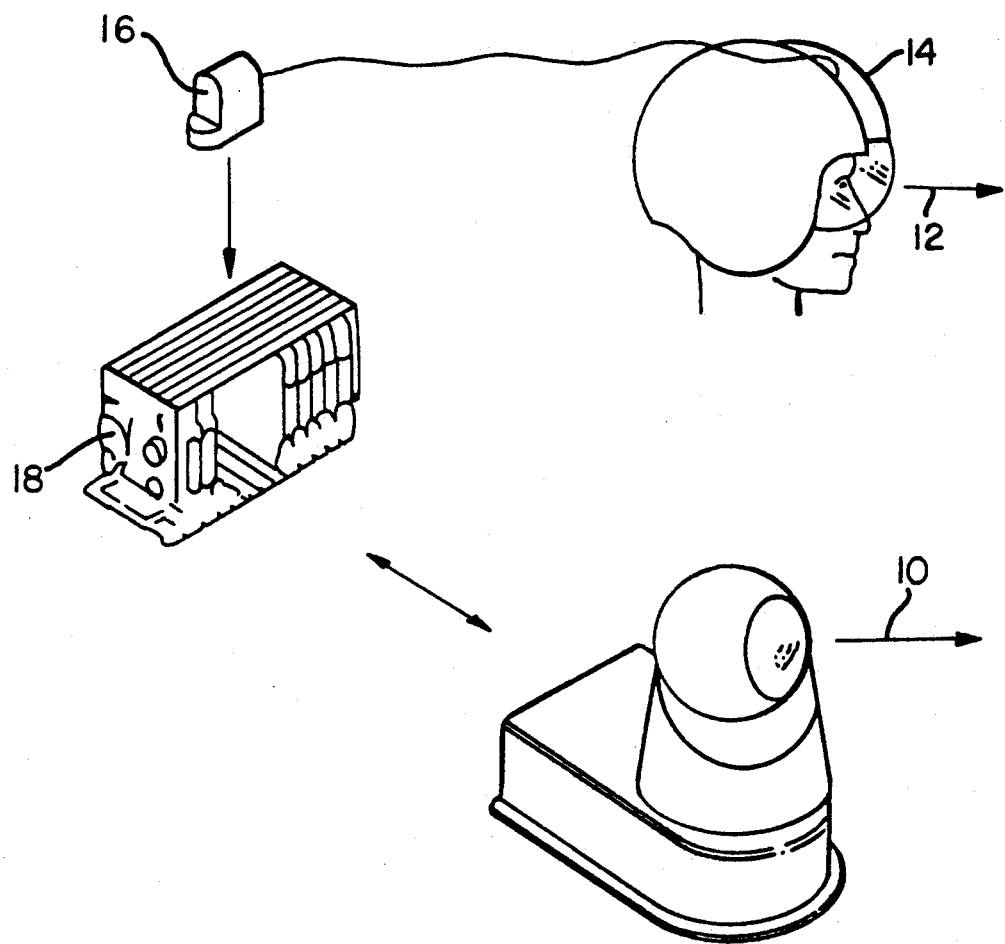
FIG. 1 is a pictorial depiction of an optical tracking system in which the present invention may be incorporated.

FIG. 1 illustrates an aircraft night vision optical tracking system having a line of sight, shown by the arrow 10, which tracks the line of sight of the pilot, shown by the arrow 12. In this system, an infrared image is captured and displayed on a screen attached to the pilot's helmet 14. The pilot can focus on this screen or look through the screen, seeing either an infrared image or a normal image, respectively. Therefore, the line of sight 10 of the system must accurately track the line of sight 12 of the pilot to provide proper image registration. The position of the pilot's helmet 14 relative to the cockpit of the aircraft is sensed magnetically and is sent by the transmitter 16 to the system electronics 18 to provide a position command signal.

Figure 2:
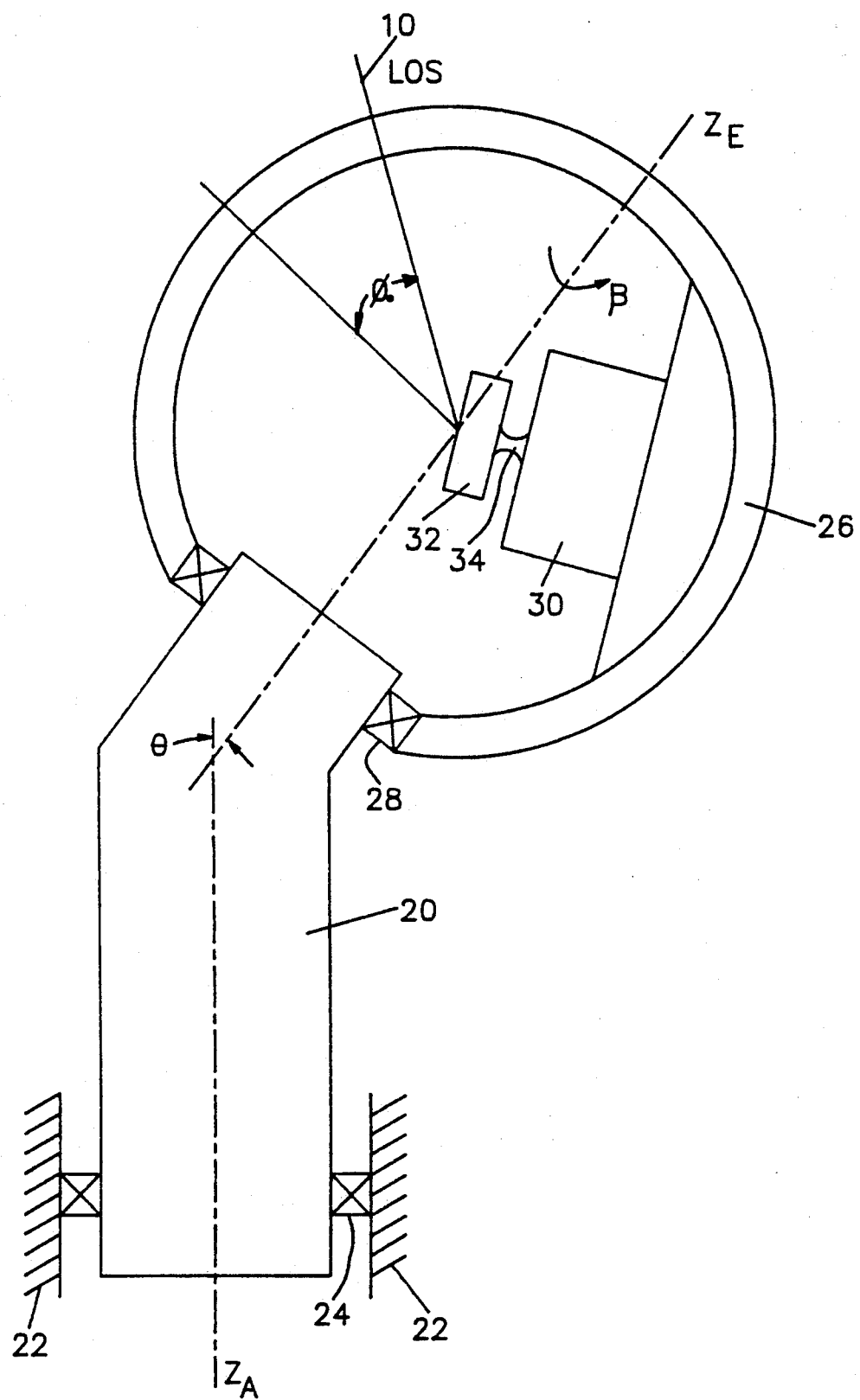
FIG. 2 illustrates the gimbal system of the optical tracking system of FIG. 1.

As best illustrated in FIG. 2, the mechanical portion of the optical tracking system includes an azimuth gimbal mounted to the aircraft structure 22, which acts as a ground plane, via the bearings 24 so as to be rotatable about an azimuth axis of rotation $Z_A$. An elevation gimbal 26 is mounted to the azimuth gimbal 20 via the bearings 28 so as to be rotatable about an elevation axis of rotation $Z_E$. The fixed angle between the axes of rotation $Z_A$ and $Z_E$ is denoted as $\Theta$. In an orthogonal gimbal set, $\Theta$ would be 90 degrees. However, in the system shown herein, the gimbal set is non-orthogonal and $\Theta$ is illustratively 45 degrees.

Fixedly mounted to the elevation gimbal 26 is a rigid block 30. A mirror 32 is movably mounted to the rigid block 30 via a flexure hinge 34. The line of sight 10 of the tracking system is reflected off the mirror 32 at the same angle from the surface of the mirror 32 as that surface is to the elevation gimbal axis of rotation $Z_E$. The angle $\phi_O$ is the fixed angle between the line of sight 10 and a plane perpendicular to the elevation gimbal axis of rotation $Z_E$ when the mirror 32 is in its nominal position, as will be described hereinafter. Specifically, $\phi_O$ is 90 degrees minus twice the angle of reflection of the line of sight 10 off the mirror 32. The angle $\beta$ is the angle of rotation of the elevation gimbal 26 about its axis of rotation $Z_E$ measured from a reference angular position of the elevation gimbal 26 where the absolute elevation angle of the line of sight 10 relative to the ground plane 22 is at its maximum.

Figure 3:
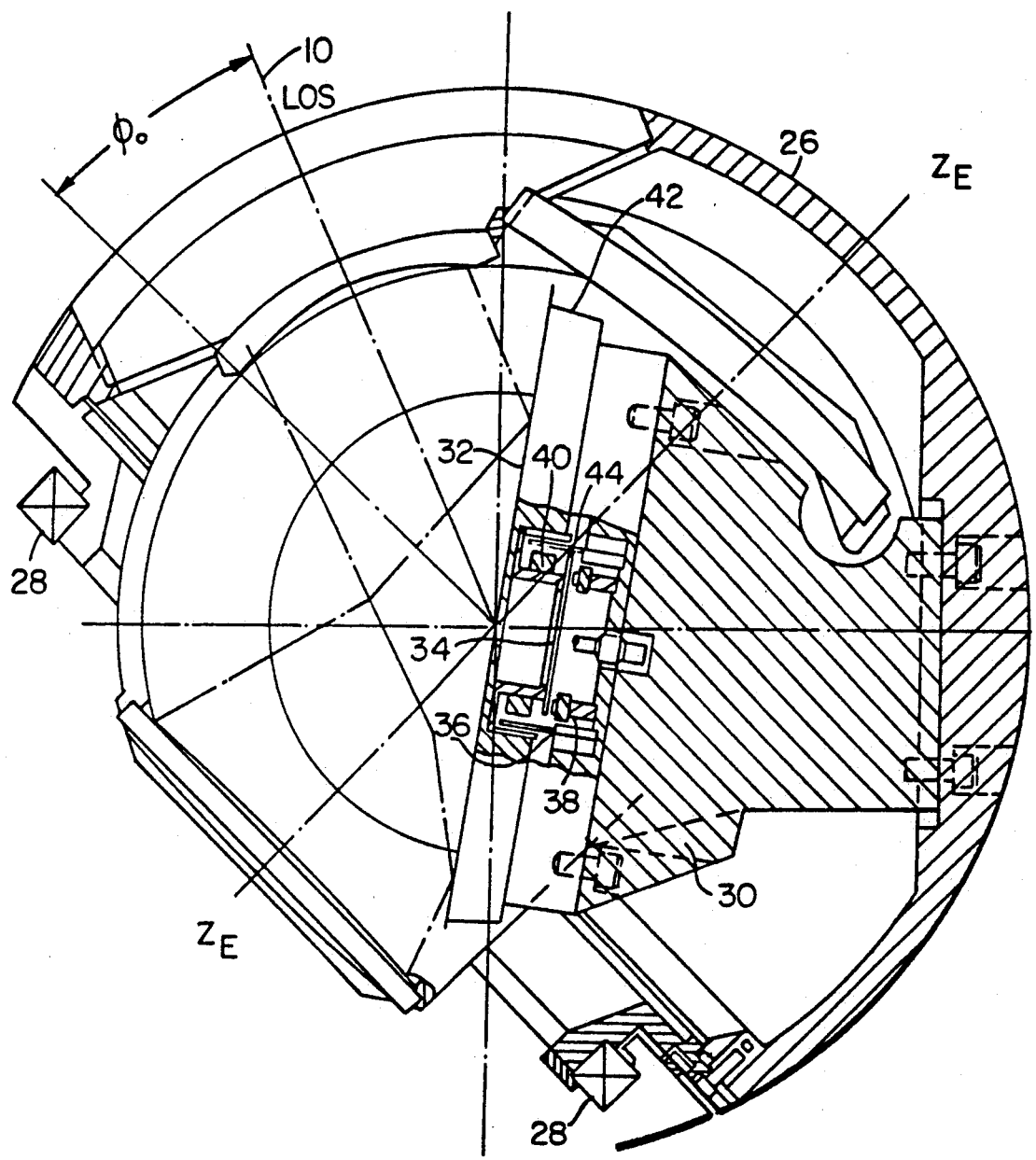
FIG. 3 is a detailed illustration showing the elevation gimbal, the rigid block and the mirror of FIG. 3.

FIG. 3 shows the elevation gimbal assembly in more detail. As shown therein, and as described in the aforereferenced U.S. Pat. No. 4,881,800, the mirror 32 is mounted to the rigid block 30 through the flexure hinge 34 which provides two axes of limited freedom and a small amount of restoring torque to the mirror 32. The end portion of the flexure hinge 34, as well as two pairs of torquer coils 36, is attached to the rigid block 30. Also attached to the block 30 are two pairs of proximity sensing pickoff coils 38. The pickoff and torquer coils 38, 36 are positioned concentrically with the flexure hinge 34 such that the two pairs of torquer coils 36 react with a permanent magnet ring 40, which is coupled to the underside of the mirror 32 within the mirror base 42. Similarly, the pickoff coils 38 react with a return path coil 44, also mounted to the mirror base 42.

The optical tracking system thus includes two positioning systems. The first positioning system is a coarse positioning arrangement which rotates the azimuth gimbal 20 and the elevation gimbal 26 so as to move the rigid block 30 about the azimuth axis $Z_A$ and the elevation axis $Z_E$. This movement is in response to the input position command signal so that the rigid block 30 attains a position defined by that position command signal. The other positioning arrangement is the stabilization arrangement which moves the mirror 32 relative to the rigid block 30 in order to negate vibrational disturbances which result in jitter of the system line of sight 10 and better track the commanded line of sight. These vibrational effects arise from two sources. The first source is vehicle vibration. The second source is vibration of the coarse positioning system generated by movement of the gimbals 20 and 26.

Figure 4:
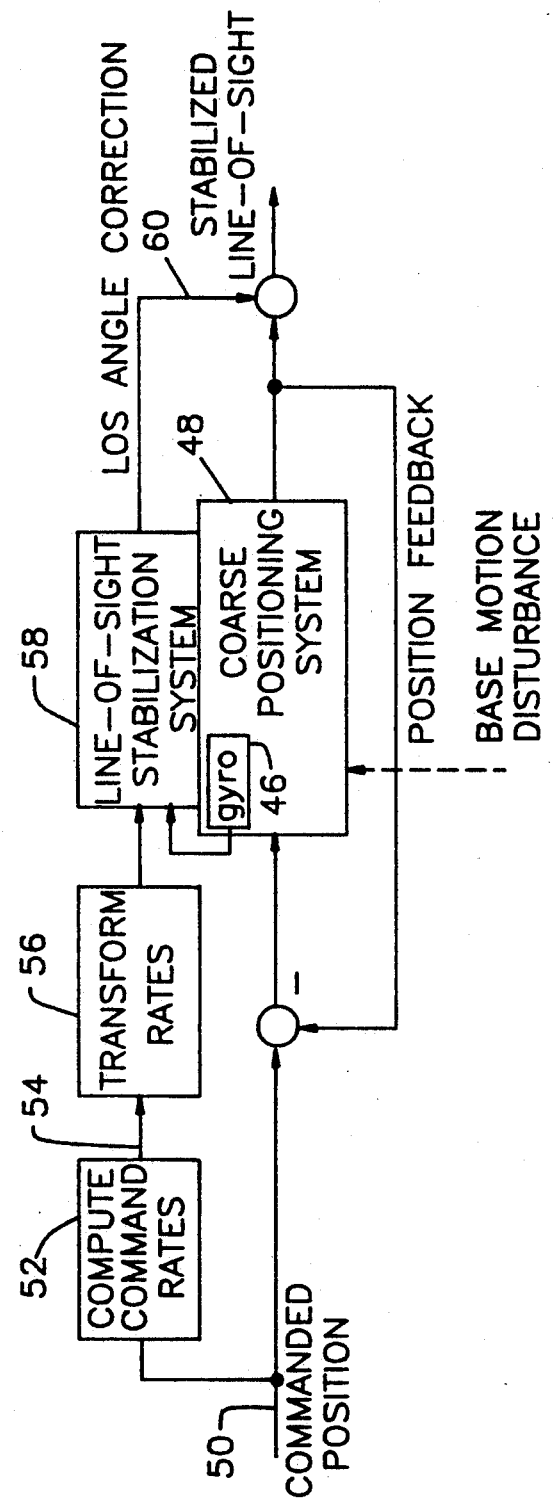
FIG. 4 is a block diagram of the mirror stabilization system of the aforereferenced U.S. Pat. No. 4,881,800.

FIG. 4 shows the mirror stabilization system of the aforereferenced U.S. Pat. No. 4,881,800, which includes a gyroscope 46 mounted to the rigid block 30 so that its spin axis is parallel to the system line of sight 10. In that system, vehicle vibration (base motion disturbance) as well as vibration induced by the coarse positioning system 48 are sensed by the gyroscope 46. A position command signal, received over the input lead 50, is processed in the block 52 to derive a command rate on the lead 54. The command rate is transformed by the block 56 onto line of sight (scene) coordinates and the transformed command rate and the gyro rate are both fed to the line of sight stabilization system 58, which derives a line of sight angle correction command from these rates. An appropriate torque is then applied to the flexure hinge 34 to drive the mirror 32 to the commanded angle so as to precisely position the mirror 32, thereby effecting the line of sight angle correction on the lead 60, and negate vibrational disturbances. In this system, since the gyroscope 46 is strapped down within the coarse positioning system 48 with its two sensitive axes perpendicular to the system line of sight, and thus aligned with the scene coordinate system, a transformation of the gyro rate to that coordinate system is unnecessary. The stabilization system 58 effectively compares the gyro rate to the transformed command rate, integrates their difference, and acts upon that signal to correct for line of sight pointing errors. This system can isolate the line of sight from vehicle angular vibration as well as coarse positioning system vibration. This is clearly an advantage if vehicle vibration is present. If, however, there is no vehicle vibration to reject, then the extra hardware that this system includes to accomplish this task becomes unnecessary and wasteful. The system shown in FIG. 4 requires a two-axis gyroscope, associated support electronics, and significant signal processing capability. Therefore, if the gyroscope 46 can be eliminated, a substantial amount of electronics can also be eliminated.

Figure 5:
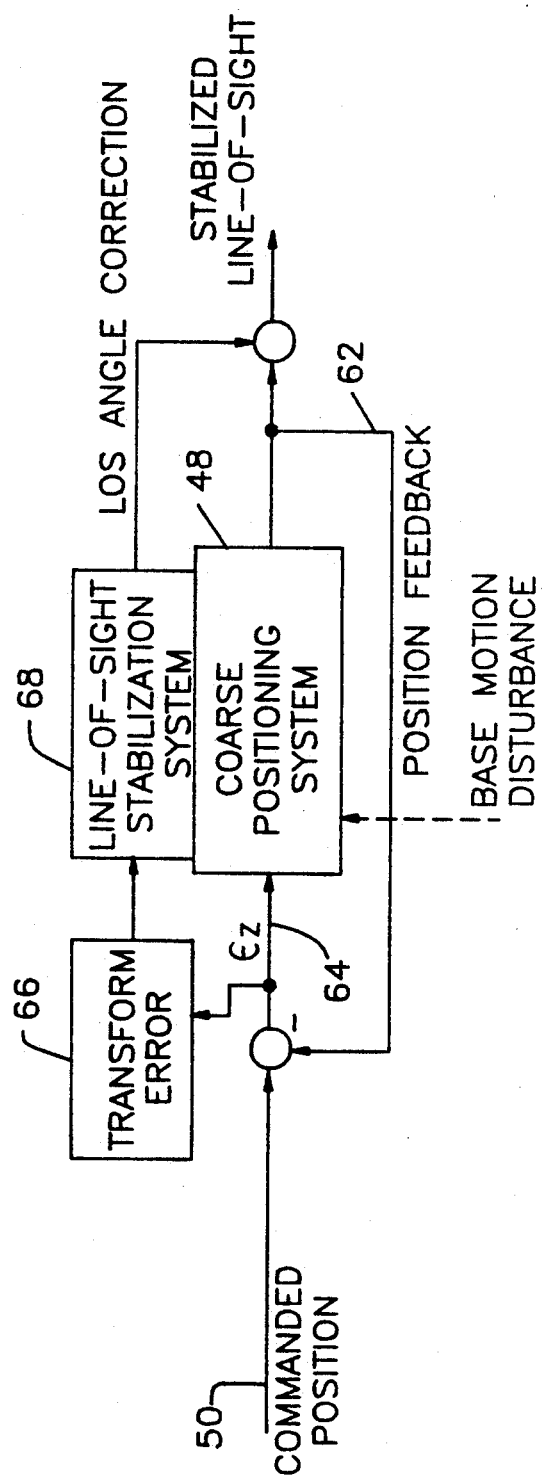
FIG. 5 is a block diagram of a stabilization system constructed according to this invention.
Figure 6:
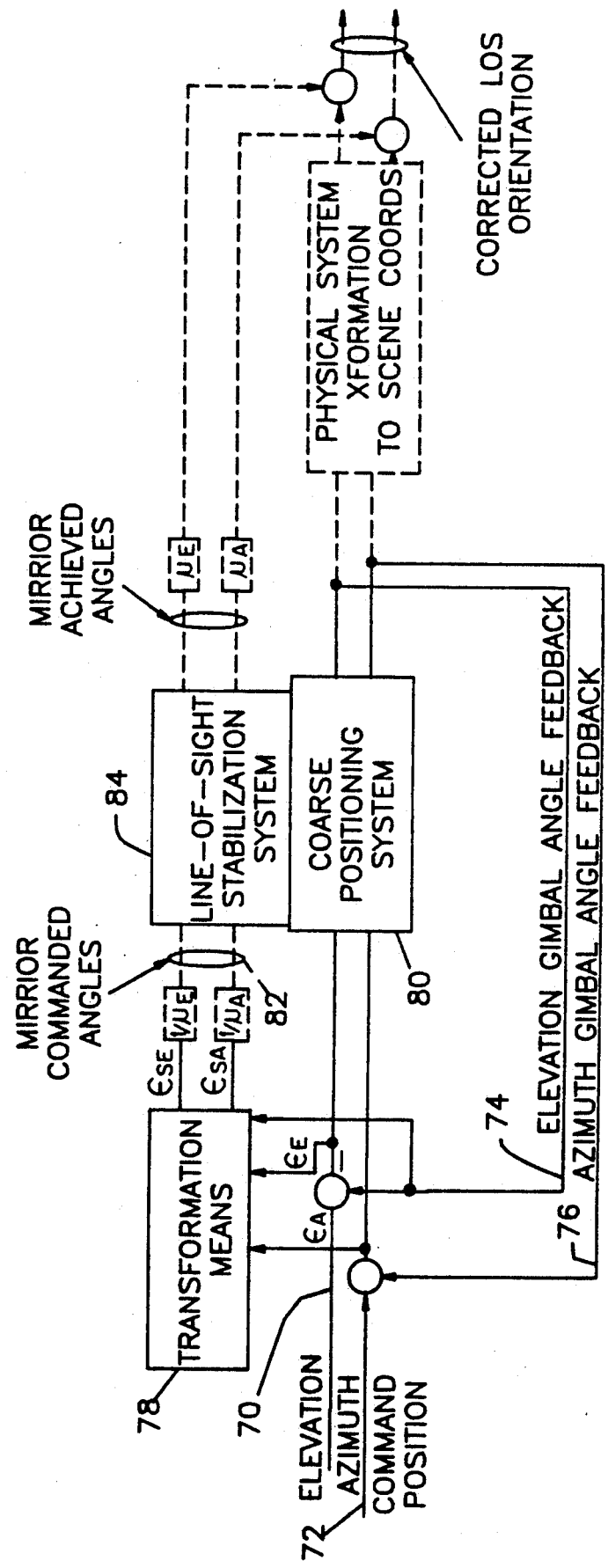
FIG. 6 is a more detailed block diagram of the system of FIG. 5.

In accordance with the present invention, aircraft vibration can exist but is assumed to be small enough to be neglected. This vibration is not sensed because the inventive system does not include a gyroscope. However, as shown in FIG. 5, vibration induced by the coarse positioning system 48 is sensed through the gimbal angle feedback on the lead 62. The difference between the position command input on the lead 50 and the angle feedback on the lead 62 is the tracking error on the lead 64. The angle feedback on the lead 62 is determined by a conventional measurement device such as a resolver. There is no need for a command processor 52 (FIG. 4) to determine command rate. According to the present invention, the tracking error of the coarse positioning system 48 on the lead 64 is transformed in the block 66 onto the coordinates of the stabilization system 68. These coordinates are also called scene coordinates because they move with the scene. The stabilization system 68 effects small changes in the orientation of the mirror 32 to cancel line of sight pointing errors induced by the coarse positioning system 48. FIG. 6 illustrates in more detail the operation of the inventive system. In FIG. 6, the solid lines represent the electronic system whereas the broken lines represent the optical system. As shown in FIG. 6, the position command signal is provided as an elevation command signal on the lead 70 and an azimuth command signal on the lead 72. These signals are compared with the sensed angular positions of the elevation gimbal 26 on the lead 74 and the azimuth gimbal 20 on the lead 76, respectively, to generate error signals, in gimbal coordinates, having an elevation component $\epsilon_E$ and an azimuth component $\epsilon_A$, respectively. These error signal components, along with the angular position $\beta$ of the elevation gimbal 26, are applied to the transformation means 78. The transformation means 78 computes corrections in scene coordinates which cancel the errors induced by the gimbals 20 and 26 of the coarse positioning system 80. The scene coordinates are fixed to the rigid block 30 and have elevation and azimuth axes perpendicular to the nominal line of sight 10 (FIG. 2). Thus, the transformation means 78 operates on its input signals to derive a stabilization signal in scene coordinates with an elevation component $\epsilon_{SE}$ and an azimuth component $\epsilon_{SA}$ from the equations:

$$\epsilon_{SE} = (-\sin\Theta \sin\beta)\beta_A; \text{ and}$$

$$\delta_{SA} = (-\sin\Theta\cos\beta\sin\phi_O + \cos\Theta\cos\phi_O)\epsilon_A + (\cos\phi_O)\epsilon_E$$

In these equations, $\Theta$ is the fixed angle between the axis of rotation $Z_A$ of the azimuth gimbal 20 and the axis of rotation $Z_E$ of the elevation gimbal 26, as shown in FIG. 2; $\phi_O$ is the fixed angle between the line of sight 10 and a plane perpendicular to the axis of rotation $Z_\epsilon$ of the elevation gimbal 26 under static conditions when the tracking error is zero (i.e., when there is no vibration and the rigid block 30 attains the exact position defined by the position command signal); and $\beta$ is the angle of rotation of the elevation gimbal 26 about its axis of rotation $Z_E$ measured from a reference angular position of the elevation gimbal 26 where the absolute elevation angle of the line of sight 10 relative to the ground plane (aircraft structure) 22 is at its maximum.

The mirror azimuth and elevation commanded positions on the leads 82 are computed by dividing the transformed error components $\epsilon_{SE}$ and $\epsilon_{SA}$ by the appropriate optical scale factors $\mu_E$ and $\mu_A$, respectively. These commands are each an input to separate stabilization system compensators, one for each axis. These compensators can be derived using standard methods, such as modern control design methods as disclosed in the aforereferenced U.S. Pat. No. 4,881,800. The compensators compare the commanded angle to the measured actual angle, and thereby generate a mirror position error. The position error is driven to zero, causing the achieved angles to track the commanded angles. All of these calculations (computation of the coarse positioning tracking error, the transformation to scene coordinates, division by the optical scale factors, and the stabilization system compensators) can be implemented digitally within a stabilization system 84 are magnified by the optical scale factors $\mu_E$ and $\mu_A$. These line of sight corrections are added to the angular orientation achieved by the coarse positioning system 80, and cancel the errors induced by that system, thereby yielding a corrected line of sight orientation.

Accordingly, there has been disclosed a stabilization arrangement within an optical tracking system for nullifying vibrational effects. The stabilization arrangement projects the pointing error of the coarse positioning system from its existing coordinate system onto scene coordinates. This converts the error into a usable form and makes it possible to use this type of stabilization arrangement, which does not include a gyroscope, with a non-orthogonal gimbal set. While an exemplary embodiment has been disclosed herein, it will be appreciated by those skilled in the art that various modifications and adaptations to the disclosed embodiment may be made and it is only intended that this invention be limited by the scope of the appended claims.

What is claimed is:

1. An optical system for establishing a line of sight normal to a scene coordinate system and relative to a ground plane by positioning a mirror in accordance with a position command signal having components in a coarse position coordinate system, said system including:
    a rigid block movable within the course position coordinate system and having a block elevation axis and a block azimuth axis;
    means flexibly coupling said mirror to said rigid block so as to provide a mirror elevation axis and a mirror azimuth axis relative to said rigid block;
    coarse positioning means responsive to said position command signal for moving said rigid block about the block elevation axis and the block azimuth axis so that said rigid block attains a position defined by said position command signal; and
    an arrangement for positioning said mirror so that vibrations of said coarse positioning means do not affect said line of sight comprising:
        means for sensing the actual position of said rigid block and providing a block position signal having components in the coarse position coordinate system and corresponding to the sensed actual position of said rigid block;
        means responsive to said block position signal and said position command signal for generating an error signal corresponding to the difference between the defined position and the actual position of said rigid block, said error signal having components in the coarse position coordinate system for said block elevation and azimuth axes;
        means for transforming the components of said error signal into scene coordinate system components defining a stabilization signal for said mirror elevation and azimuth axes; and
        means responsive to said stabilization signal for moving said mirror relative to said rigid block.

2. The optical system according to claim 1 wherein the coarse positioning means includes an azimuth gimbal with an axis of rotation and an elevation gimbal with an axis of rotation, the azimuth gimbal is mounted to the ground plane, the elevation gimbal is mounted to the azimuth gimbal, the axis of rotation of the elevation gimbal intersects the axis of rotation of the azimuth gimbal, the rigid block is fixedly mounted to the elevation gimbal so that said block elevation axis is the same as said elevation gimbal axis of rotation and said block azimuth axis is the same as said azimuth gimbal axis of rotation, the error signal in the coarse position coordinate system has an azimuth component $\epsilon_A$ and an elevation component $\epsilon_E$, and the transforming means derives said stabilization signal in scene coordinates with an azimuth component $\epsilon_{SA}$ and an elevation component $\epsilon_{SE}$ from the equations:

$$\epsilon_{SE} = (-\sin \Theta \sin \beta)\epsilon_A; \text{ and}$$

$$\epsilon_{SA} = (-\sin \Theta \cos \phi_O + \cos \phi_O)\epsilon_A + (\cos \phi_O)\epsilon_E;$$

where $\Theta$ is the fixed angle between the axes of rotation of the azimuth and elevation gimbals, $\phi_O$ is the fixed angle between the line of sight and a plane perpendicular to the axis of rotation of the elevation gimbal under static conditions when the error signal is zero, and $\beta$ is the angle of rotation of the elevation gimbal about its axis of rotation measured from a reference angular position of the elevation gimbal where the absolute elevation angle of the line of sight relative to the ground plane is at its maximum.

* * * * *